US011128583B2

(12) United States Patent
Pickens et al.

(10) Patent No.: US 11,128,583 B2
(45) Date of Patent: Sep. 21, 2021

(54) DIGITAL DOCUMENT DISTRIBUTION PROCESS

(71) Applicant: Securus Technologies, Inc., Carrollton, TX (US)

(72) Inventors: Connor Pickens, Little Elm, TX (US); Alice J. Clements, Coppell, TX (US)

(73) Assignee: Securus Technologies, LLC, Carrollton, TX (US)

( * ) Notice: Subject to any disclaimer, the term of this patent is extended or adjusted under 35 U.S.C. 154(b) by 103 days.

(21) Appl. No.: 16/047,826

(22) Filed: Jul. 27, 2018

(65) Prior Publication Data

US 2020/0036663 A1    Jan. 30, 2020

(51) Int. Cl.
| | |
|---|---|
| *G06F 15/16* | (2006.01) |
| *H04L 12/58* | (2006.01) |
| *G06F 21/31* | (2013.01) |
| *H04L 29/06* | (2006.01) |
| *H04L 29/08* | (2006.01) |
| *G06Q 50/26* | (2012.01) |
| *G06F 16/95* | (2019.01) |

(52) U.S. Cl.
CPC .......... *H04L 51/046* (2013.01); *G06F 16/95* (2019.01); *G06F 21/31* (2013.01); *G06Q 50/26* (2013.01); *H04L 51/08* (2013.01); *H04L 51/10* (2013.01); *H04L 67/10* (2013.01); *H04L 67/42* (2013.01)

(58) Field of Classification Search
CPC ....... H04L 51/046; H04L 51/08; H04L 51/10; H04L 67/42; H04L 67/10; G06F 21/31; G06Q 50/26
See application file for complete search history.

(56) References Cited

U.S. PATENT DOCUMENTS

| | | | | |
|---|---|---|---|---|
| 2002/0112015 A1* | 8/2002 | Haynes | ................... | H04L 51/28 |
| | | | | 709/206 |
| 2005/0004951 A1* | 1/2005 | Ciaramitaro | ............ | G06F 16/93 |
| 2006/0245559 A1* | 11/2006 | Hodge | .................... | H04L 51/38 |
| | | | | 379/88.19 |
| 2014/0344369 A1* | 11/2014 | Goldberg | ................ | H04L 51/34 |
| | | | | 709/206 |
| 2015/0371053 A1* | 12/2015 | Welch | ................. | G06F 21/6227 |
| | | | | 726/30 |
| 2017/0017646 A1* | 1/2017 | Kumar | ................... | G06Q 10/10 |
| 2017/0237717 A1* | 8/2017 | Starosielsky | ......... | G06F 21/602 |
| | | | | 713/176 |

* cited by examiner

*Primary Examiner* — Padma Mundur
(74) *Attorney, Agent, or Firm* — Fogarty LLP (57) ABSTRACT

Systems and methods for managing privileged communications in a controlled-environment facility are disclosed. A privileged communication is received from a user via an online portal, wherein the user having been previously confirmed as having a privileged relationship with a resident of the controlled-environment facility, transmitting the privileged communication to the resident in a manner that prevents inspection by controlled-environment facility staff, and notifying the user when the privileged communication has been accessed by the resident. The privileged communication may be one or more of a document, an image, a text message, an email, a voicemail, or any other electronic or digital communication.

19 Claims, 3 Drawing Sheets

DIGITAL DOCUMENT DISTRIBUTION PROCESS

BACKGROUND

Correctional facilities, such as prisons and jails, usually allow residents (i.e., inmates) to communicate with family, friends, attorneys, and others outside the facility to allow the residents to maintain personal connections, manage legal matters, and to facilitate their transition back into society upon release. Most controlled-environment facilities allow some form of telephone calls, in-person visitation, video visitation, etc. for such communication. Additionally, residents are typically allowed to send and receive mail through the U.S. Postal Service. Generally, all incoming and outgoing mail is subject to opening and manual inspection by correctional staff. The types of items that may be mailed to a resident vary depending upon the facility, but generally include written correspondence, legal or personal documents, postcards or greeting cards, pictures, pamphlets, books, or the like. Resident's right to receive and send mail is subject only to the institution's right to censor letters or withhold delivery if necessary to protect institutional security, and if accompanied by appropriate procedural safeguards. The facility's restrictions on mail received by residents must be rationally related to a legitimate penological interest.

To avoid receipt of illegal substances or contraband, mail is inspected by the facility prior to delivery to residents. Most facilities have an extensive list of items that cannot be mailed to residents. For example, certain facilities do not deliver inbound mail if it contains gummed or adhesive labels (e.g., for the return address), non-postal stamps, or stickers that may be used to transport drugs. Mail containing such items may be destroyed or disposed of instead of being delivered to the residents. Incoming non-privileged mail from friends and family may be opened outside the resident's presence and inspected for contraband.

Attorneys that need to deliver legal documents to incarcerated clients must mail the document to the facility or bring the document to the facility in person. Privileged mail, such as a legal document from an attorney, is entitled to greater confidentiality and freedom from censorship than non-privileged mail from friends and family. In order for mail to be treated as privileged, it must be clearly marked. Privileged mail may be briefly held to verify the identity of the addressee. Privileged mail may be checked for contraband but cannot be read in the ordinary course of facility routine; however, the contraband check must be conducted in front of the resident. If a resident receives a piece of privileged mail that has been opened outside his or her presence, then the resident is likely to file a grievance with the facility.

The trend toward use of electronic mail in place of physical mail is expanding to correctional facilities, which are starting to allow residents to send and receive electronic messages. The content of these messages may be scanned using keyword detection for investigative purposes. However, electronic privileged correspondence must be treated like physical privileged mail and must not be read by the correctional facility staff.

Both physical mail and electronic messages are subject to abuse by false claims of privilege. This can create a path for improper correspondence with residents if communications are falsely alleged to be privileged and/or if someone falsely claims to have an attorney-client relationship with a resident.

Additionally, legal correspondence and privileged documents that are held within a resident's room or cell should also be treated as confidential and privileged. However, searches of an inmate's cell risk that physical copies of privileged correspondence or documents may be opened and read by facility staff. Since correctional officers would typically take steps to avoid reading privilege documents, residents may improperly attempt to disguise or hide contraband material within their privileged legal correspondence and documents.

SUMMARY

The present invention is directed to systems and methods for managing privileged communications in a controlled-environment facility. In one embodiment, a method comprises receiving a privileged communication from a user via an online portal, wherein the user having been previously confirmed as having a privileged relationship with a resident of the controlled-environment facility, transmitting the privileged communication to the resident in a manner that prevents inspection by controlled-environment facility staff, and notifying the user when the privileged communication has been accessed by the resident. The privileged communication may be one or more of a document, an image, a text message, an email, a voicemail, or any other electronic or digital communication.

The method may further comprise storing the privileged communication in a manner that prevents inspection by controlled-environment facility staff, and notifying the resident that the privileged communication has been received. Confirming that the user has a privileged relationship with a resident of the controlled-environment facility may comprise verifying the user's identity with a public database, and verifying a professional registration for the user with a professional organization.

The pubic database may be selected, for example, from one or more of: a state (or city or county) agency database, a federal agency database, a drivers' license database, a public identity card database, a marriage record database, a passport database, and the like. The professional organization may be selected from one or more of: an attorney bar association, a medical association, a religious organization, a union, and the like.

Transmitting the privileged communication to the resident in a manner that prevents inspection may further comprise encrypting the privileged communication when it is received, transmitting the encrypted privileged communication to a resident device, and decrypting the privileged communication at the resident device. Alternatively, or additionally, transmitting the privileged communication to the resident in a manner that prevents inspection may comprise transmitting the privileged communication via a channel that is separate from a nonprivileged communication channel, wherein communications on the nonprivileged communication channel are processed in at least one of the following ways: alerted, recorded, inspected, scanned, or monitored.

The method may further comprise allowing the resident to edit the privileged communication, and transmitting the edited privileged communication to the user in a manner that prevents inspection by controlled-environment facility staff. Editing the privileged communication may comprise adding an electronic signature to the privileged communication server communication. The method may further comprise storing the edited privileged communication in a manner that prevents inspection by controlled-environment facility staff.

In another embodiment, a system comprises a controlled-environment resident device running a client application operable to access privileged communications, and a privileged communication server comprising at least one processor, and a memory coupled to the at least one processor. The memory may be configured to store program instructions executable by the at least one processor to cause the privileged communication server to: receive a privileged communication from a sender via an online portal, the sender having been previously confirmed as having a privileged relationship with a resident of a controlled-environment facility, transmit the privileged communication to the controlled-environment resident device in a manner that prevents inspection by controlled-environment facility staff, notify the resident that the privileged communication has been received, and notify the sender when the privileged communication has been accessed by the resident. The system may further comprise a database configured to store the privileged communication in a manner that prevents inspection by controlled-environment facility staff. The privileged communication may be one or more of a document, an image, a text message, an email, a voicemail, or any other electronic or digital communication.

The privileged communication server may be configured to: verify the sender's identity with a public database, and verify a professional registration for the sender with a professional organization. The privileged communication server may be further configured to: encrypt the privileged communication when it is received, transmit the encrypted privileged communication to the controlled-environment resident device, and decrypt the encrypted privileged communication at the controlled-environment resident device. The privileged communication server can be further configured to: transmit the privileged communication to the controlled-environment resident device via a channel that is separate from a nonprivileged communication channel, wherein communications on the nonprivileged communication channel are processed in at least one of the following ways: alerted, recorded, inspected, scanned, or monitored.

The controlled-environment resident device may be further configured to: allow the resident to edit the privileged communication, and transmit the edited privileged communication to the privileged communication server in a manner that prevents inspection by controlled-environment facility staff. The privileged communication may be edited by adding an electronic signature to the privileged communication. The privileged communication server can be further configured to store the edited privileged communication in a manner that prevents inspection by controlled-environment facility staff.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. The drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to managing the exchange of privileged communications between residents of a facility and attorneys or other nonresidents.

Current correctional facilities do not adequately provide for residents to communicate electronically with their attorney in a confidential or privileged manner. For facilities that allow electronic messaging with clients, legal or privileged correspondence may be improperly scanned for keywords if they are not adequately marked as privileged or if they are not properly processed. Additionally, residents do not currently have the capability to store privileged documents electronically.

The systems and methods disclosed herein allow for electronic communication of privileged documents, which reduces the need for an attorney to travel to the correctional facility in person. This saves attorney time and expense in addition to reducing facility visitor traffic, which further reduces inmate movement within the facility and the need for correctional officer escorts for attorney meetings. Attorneys and their incarcerated clients may securely communicate over a digital platform using the systems and methods disclosed herein. Attorneys may initiate privilege document exchange via a website, and residents access the privilege documents via a terminal, kiosk, or personal inmate device, such as tablet. This process will reduce the number of inmate grievances filed and lawsuits against correctional facilities for violating privileged communications. For residents, the process speeds up the exchange of legal documents and protects attorney-client confidentiality. For attorneys, this solution speeds up communication time and reduces the need to travel to a correctional facility. Another benefit would be security as well as time. Allowing electronic privileged communication reduces the number of in-person visits required by legal staff, for example, which limits the exposure of potential negative incidents with residents.

Figure 1:
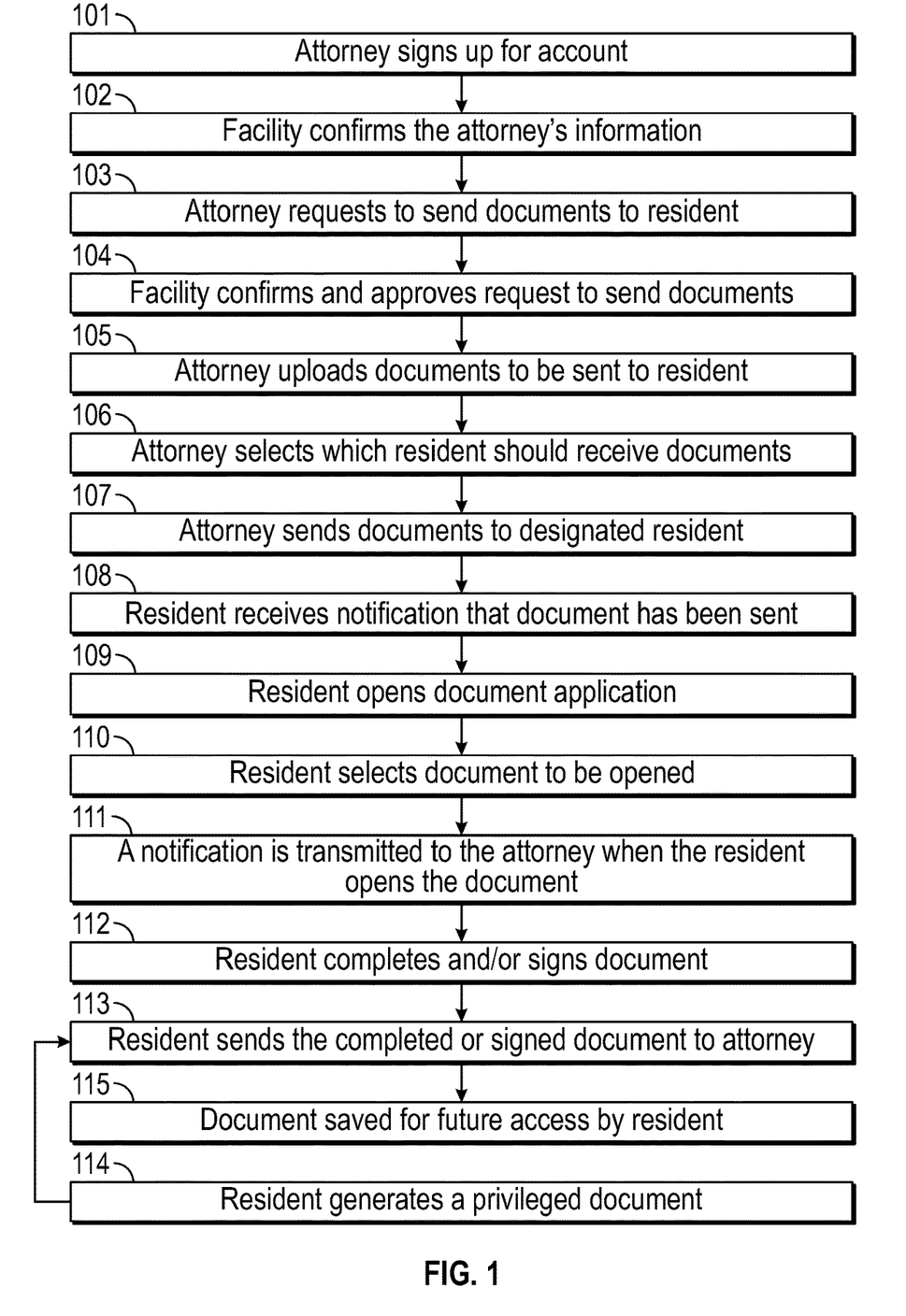
FIG. 1 is a flowchart illustrating one method for providing confidential and/or privileged documents to a resident of a controlled-environment facility.

FIG. 1 is a flowchart illustrating one method for providing confidential and/or privileged documents to a resident of a controlled-environment facility while preventing improper access by facility staff and eliminating the introduction of contraband materials. In step 101, a user, such as an attorney, signs up for account to exchange privileged documents. The sign-up process may be through a website or online portal, for example. The sign-up process requires users to verify their identity and their status as an attorney. The user provides identifying information, such as name, address, employer, attorney license or bar registration data, and/or other unique information. Registration and authentication credentials may be generated during the registration process, such as passwords, certificates, or biometric information that can be used to access a privileged document exchange system.

In step 102, the facility confirms the information provided by the user. The user's identity may be verified, for example, by taking a picture of a person who is registering and comparing that picture to a database, such as images in a driver's license database. The user's status as an attorney may be verified by comparing their name and/or license data to a registration database, such as a state bar database. Although the example embodiment of FIG. 1 references attorney-client privilege, it will be understood that any user with a need to exchange privileged or confidential information may be registered with the system, including, for example, clergy (for priest-penitent privilege), doctors (for physician-patient privilege), spouses (for spousal privilege), or others for whom communications may be privileged.

In step 103, the user requests to send documents to a resident of the controlled-environment facility. For example, an attorney may request to send privileged legal documents to an inmate of a prison or jail. In step 104, the facility confirms and/or approves the request to send documents. The confirmation and approval process may comprise verifying the resident's location, the resident's electronic messaging address, and evaluating any restrictions on communications with the resident. In step 105, the user uploads documents to be sent to the resident. The system may require specific document types or file formats or may allow any digital document or file to be uploaded. For example, in one embodiment, the privileged document exchange system may limit documents to image files and/or files without readable text (e.g., PDF-format documents that have not been processed using optical character recognition). This may provide a user with a higher level of confidence that the documents cannot be electronically "read" or scanned.

In step 106, the user selects which resident should receive the uploaded documents. The user may be approved to send documents to multiple residents, such as an attorney who represents multiple inmates. Such attorneys would need to select a specific recipient for the uploaded documents. To provide a higher level of security, the user may encrypt or password-protect the uploaded document. In step 107, the user sends the document to the designated resident.

In step 108, the resident receives a notification that a document has been sent to them. The notification may be received when the resident logs onto a terminal or tablet and/or logs into a messaging application. In step 109, the resident opens an application to read or view the document. The document viewing application may be part of the messaging application or may be a separate application. The resident may be required to provide the appropriate login credentials to verify the identity of the resident who is accessing the messaging or document application and/or to provide a password or credentials to open an encrypted document.

In step 110, the resident selects the document to be opened. The resident may receive multiple documents from the sending user and/or may receive documents from multiple approved senders, such as different members of a legal team. In step 111, a notification is transmitted to the sending user when the resident opens the document. This provides a confirmation to the sender that the document was received and opened. In other embodiments, additional status information may be available to the sender, such as, for example, whether the document was available to the resident, whether the resident has been notified that the document is available, whether the document was opened, how many times the document was opened, and whether the document was modified or saved.

In some cases, the sender may require the resident to provide information, such as completing a form, revising the document, signing the document, or the like. In step 112, the resident completes and/or signs the document. The resident may provide an electronic signature on the document, such as an electronic sound, symbol, or process that is attached to or logically associated with the document and executed or adopted by the resident with the intent to sign the document.

In step 113, the resident can choose to return the completed or signed document to the sender. In other embodiments, the resident may generate or create a privileged document in step 114. This would allow the resident to initiate sending information to an approved user. For example, the resident could create instructions for an attorney and then send the information in step 113. The documents sent in step 113 are not inspected by the controlled-environment facility or staff since the documents are being sent to a recipient has been previously designated for privileged communications in step 102.

In one embodiment, the privileged communications may be sent only in one direction, such as from the approved user to the resident. This may be a default setting or may be selected by the approved user. For example, an approved user may send a privileged communication to a resident using a setting that does not allow the resident to reply or that indicates that a reply will be blocked, rejected, or ignored. The number of resident responses, if allowed, may also be selected by the approved user. For example, the resident may only be allowed to respond one time to a privileged communication. Alternatively, the approved user may allow the resident to respond a selected number of times or an unlimited number of times to one privileged communication.

In step 115, any privileged documents received, generated, signed, and/or sent are saved so that they are available for the resident to view later. The saved documents may be retained indefinitely or for a configurable amount of time.

The privileged document exchange system may be available for use by all residents or may be restricted to residents or approved users who have a subscription to the service. In one embodiment, the approved user and/or resident may be charged a flat fee (e.g., a monthly fee) to use the service. Alternatively, the approved user and/or resident may be charged a per-message, per-communication, and/or per-transaction fee. The resident may have an account (e.g., trust account or commissary account) that can be charged for privileged communication fees. The approved user may also be charged for privileged communications sent by a resident, or may pre-pay for expected responses or new privileged communications sent by a resident.

Figure 2:
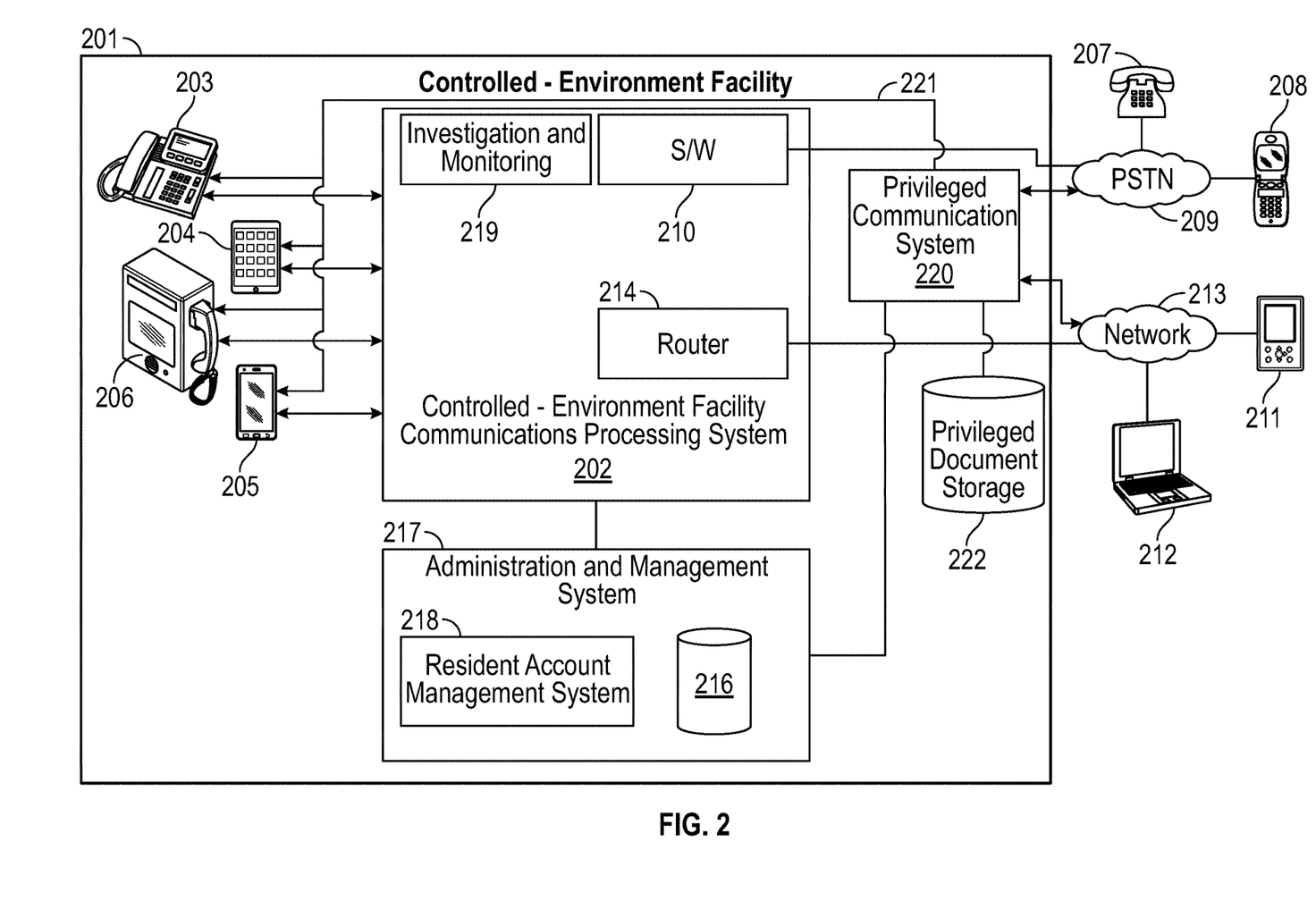
FIG. 2 illustrates an example system for providing exchange of privileged documents in a controlled-environment facility.

FIG. 2 illustrates an example system for providing exchange of privileged documents in a controlled-environment facility 201. Communications processing system 202 provides telephone services, video conferencing, online chat, and other communication services to controlled-environment facility 201. Communications processing system 202 may assume a variety of forms, such as any processor-based computing system hosted on a dedicated server or distributed among one or more virtual or cloud-based servers. Communications processing system 202 may be configured to serve a variety of facilities and/or users, whether within or outside of a controlled-environment facility.

Residents of controlled-environment facility 201 may use conventional telephones 203 to access communication services via communication processing system 202. Alternatively, residents may use a portable wireless device 204 or 205, such as a tablet computing device, laptop, or smartphone, that has been adapted and/or approved for use in controlled-environment facility 201. Such a device 204, 205 may be referred to as a resident communications device or Intelligent Resident Device (IRD). In a correctional institution, such an IRD 204, 205 may be referred to as an Intelligent Inmate Device (IID), or the like. In some facilities, a resident may use a video communication device 206 for standard voice calls as well as for video communication. Video communication device 206 may be referred to as an Intelligent Facility Device (IFD), which may be a specialized video conferencing terminal, such as a processor-based self-service kiosk user terminal. Generally, IFD 206 may be disposed in a dedicated location, such as a visitation room, day room, or pod. On the other hand, IRD 204, 205 are portable and may be used in various locations throughout controlled-environment facility 201.

Each portable IRD 204, 205 may be particularly adapted for use in a controlled-environment. For example, in a correctional institution, jail, prison, or the like, such devices may be "stripped-down," particularly from the standpoint of the application programs (apps) that are provided or allowed on the device and/or the connectivity afforded to the device. For example, devices 204, 205 may be adapted to connect only to a network in the controlled-environment facility and/or connect only within certain locations in the controlled-environment facility. Such connectivity may be controlled, for example, by providing Wi-Fi access only in certain areas. Resident Wi-Fi access may be compartmentalized within the controlled-environment facility by selective placement of wireless access points, antenna directionality of the wireless access points, or other measures that limit Wi-Fi signal coverage.

Devices 204-206 may have a limited number of applications pre-installed, such as a communications or video conferencing program. The installation of additional applications on devices 204-206 may be forbidden (e.g., prevented by modifications to the device's operating system or the like) and/or restricted, (e.g., by requiring permission from a facility administrator). The applications provided on devices 204-206 may be associated with particular interests of the controlled-environment facility residents. For example, devices 204-206 might include applications that provide access to legal research services, education or training, employment searching applications, or the like. Hence, devices 204-206 may be used to help soon to be released inmates transition to the world outside the facility. For example, devices 204-206 may be used to obtain skills or training and to communicate with potential future employers.

In some embodiments, devices 204-206 may be implemented as a processor-based system. For example, devices 204-206 may include a processor running software that provides a video conference application. The processor may control any suitable electronic display on devices 204-206, such as a Liquid Crystal Display (LCD), an Organic Light Emitting Diode (OLED) display, a touchscreen display (e.g., resistive, capacitive, etc.), or the like. Devices 204-206 may include a keyboard or keypad input that is a physical part of the device or that appears virtually on the display. Devices 204-206 also have a speaker and microphone, which may be a discrete component or part of handset, that are used by the video conference application.

A resident may initiate a call or video conference by launching an applications program on devices 204-206 or by calling into a conference telephone number using device 203. The resident may then be prompted to provide a personal identification number (PIN), other identifying information, or biometrics. An interactive voice response (IVR) unit (not shown) integrated into communications processing system 201 may generate and play a prompt or other message to the resident on devices 203-206 when initiating the video conference session. Under the control of communications processing system 202, devices 203-206 may be capable of connecting to another party's communication device 207 or 208 (e.g., a non-resident) across publicly switched telephone network (PSTN) 209. Device 208 may be a smartphone or other mobile device, and telephone 207 may be located at a home or office. Switching circuitry 210 in communications processing system 202 may be used to connect calls from the controlled-environment facility network to PSTN 210 and devices 207, 208.

Additionally, or alternatively, a non-resident party may communicate using devices 211 or 212, which may be connected through an Integrated Services Digital Network (ISDN), Voice-over-IP (VoIP) network, or other packet data network 213, such as the Internet. Router 214 is used to route data packets associated with a call or video conference connection to devices 211 or 212. For example, the other party may have a personal or laptop computer 212 with an integrated camera and display.

In addition to providing certain communication and video conferencing operations, communication processing system 202 typically ensures that the residents' calls, video conferences, online chats, text messages, etc. are connected only to non-residents whose identities, devices, email addresses, phone numbers, etc. are listed in that resident's pre-approved contact (PAC) or personal allowed numbers (PAN) list. The PAC/PAN may be a whitelist or a blacklist that identifies contacts that are allowed or restricted for the resident. Each resident's PAN list may be stored, for example, in a database 216 that is maintained by an administration and management system (AMS) 217, a jail management system (JMS), or the like. In addition to PAC/PAN lists, AMS 217 and database 216 may also store inmate or resident profile data (RPD), such as inmate trust and calling account balances, trial schedules, conviction data, criminal records, sentencing data, release date, cell and cellmate assignments, resident restrictions and warnings, commissary order history, telephone call history, call recordings, known or suspected gang or criminal affiliations, known or suspected affiliates or accomplices, and any other information that may be relevant or useful to correctional facility staff.

AMS 217 may further comprise a resident account management system 218 to maintain resident accounts, such as resident communications accounts, commissary accounts, or other accounts that benefit residents. These accounts may be used, for example, to pay for communications, such as phone calls, video conferencing sessions, online chats, emails, text messages, or the like. Resident account management system 218 may be a separate system or may be a part of or a function of AMS 217.

In some embodiments, communications processing system 202 is configured to monitor and/or record the residents' telephone calls, video conference sessions, and/or other communications (e.g., email, text message, chat, etc.). An investigation and monitoring module 219 may record all or some resident communications. The communications may be monitored in real-time by an investigator or automatically monitored to detect the use of selected keywords or nonresident video content, for example. The content and metadata associated with the residents' communications may be recorded and stored for later analysis, review, or investigation. The investigation and monitoring module 219 may generate alerts for communications that have been recorded, inspected, scanned, or monitored by communications processing system 202. The alerts may notify investigators or facility staff, for example, that a certain communication contains a keyword or was sent by/to an individual of interest.

In one embodiment, a privileged communication system 220 that provides document management services between residents of controlled-environment facility 201 and nonresidents who are outside controlled-environment facility 201. In particular, privileged communication system 220 allows residents of controlled-environment facility 201 to receive and send privileged documents to nonresidents. A privileged communication may be removed from investigatory or data mining efforts to which non-privileged communications are subject. Additionally, some embodiments allow for encryption of privileged communications as an additional level of security.

As noted above with respect to FIG. 1, a nonresident user registers to use privileged communication system 220 by providing identification information and proof that the nonresident is in a privileged status with respect to one or more residents. The privileged communication system 220 may be used by attorneys or law firm employees asserting an attorney-client privilege, clergy or religious personnel asserting a priest-penitent privilege, doctors and medical staff asserting a physician-patient privilege, or spouses asserting a spousal privilege. Not all privileges may be available in all controlled-environment facilities 201 depending upon the type of resident and the applicable jurisdiction.

Privileged communication system 220 may be co-located with controlled-environment facility 201 as illustrated. Alternatively, privileged communication system 220 may be centrally or remotely located with respect to one or more controlled-environment facilities and/or may provide document services to multiple controlled-environment facilities. More generally, however, it should be noted that privileged communication system 220 may assume a variety of forms, such as any processor-based computing system hosted on a dedicated server or distributed among one or more virtual or cloud-based servers. Privileged communication system 220 may be configured to serve a variety of facilities and/or users, whether within or outside of a controlled-environment facility. Privileged communication system 220 may provide a website or online portal that can be accessed via approved users' digital devices 211, 212 to register with the privileged communication system and to upload/download or send/receive privileged communications. Nonprivileged communications bypass privileged communication system 220 and instead are routed by communications processing system 202 to resident devices 203-206.

Privileged communication system 220 allows residents to access privileged documents via a separate physical and/or logical path 221. This allows privileged communications, such as documents, to be accessed without exposing them to normal communication processing in communication processing system 202. In particular, the privileged communications are not subject to monitoring, scanning, or recording by investigation and monitoring module 219. The privileged communications may be documents or other messages. In other embodiments, privileged communications, such as electronic mail, voice mail, or text messages, may be sent to, or received from, residents via privileged document processing system. For example, a resident may be assigned a nonprivileged communication address (e.g., an email address, URL, or telephone number). Communications directed to the nonprivileged communication address are routed through communication processing system 202. The resident may also be assigned a separate privileged communication address. Communications directed to the privileged communication address are routed to privileged communication system 220 for handling.

For example, an approved privileged nonresident user at device 211 or 212 may send or receive (upload or download) privileged documents or messages to privileged communication system 220. Older or less capable communications devices 207, 208 may send messages to residents via SMS text message or using auto-attendant functionality at privileged communication system 220. For example, privileged communication system 220 may comprise applications, such as a voice response unit (VRU) or interactive voice response (IVR) function, that allows privileged nonresident users to provide privileged information to residents using voice commands. Privileged communication system 220 may further comprise speech-to-text (and/or text-to-speech) capability to allow a user to send messages to residents.

Resident devices 203-206 comprise a privileged document application and/or messaging application that allows the resident to access privileged communication system 220. These applications allow the resident to receive, download, access, create, upload, or send privilege documents. The privileged document application and/or messaging application allows the resident device 203-206 to bypass the monitoring capabilities of communication processing system 202.

In one embodiment, privileged documents are encrypted at privileged communication system 220 and then decrypted on resident device 203-206 when the resident accesses the document. The encryption/decryption may be accomplished using a password or key that is unique to the resident so that the document can be opened or inspected between privileged communication system 220 and then decrypted on resident device 203-206.

Privileged documents, messages, and other communications may be stored in privileged document storage 222. Privileged document storage 222 may comprise a database of registered privileged users (residents and nonresidents) who are authorized to communicate via privileged communication system 220. The registered users maintained in the database may be individuals to or from whom a privileged communication may be sent or received, such as attorneys, clergy, doctors, respective spouses, or the like. The information that populates the database can be, for each user, for example, the user's name, the user's professional license number (such as for attorneys), contact information (such as telephone number for SMS text and email address), or the like. Additionally, the information can include a particular resident with whom communication with the registered user may be privileged. In other embodiments, privileged communication system information may be maintained in database 216 that is part of administration and management system 217.

Figure 3:
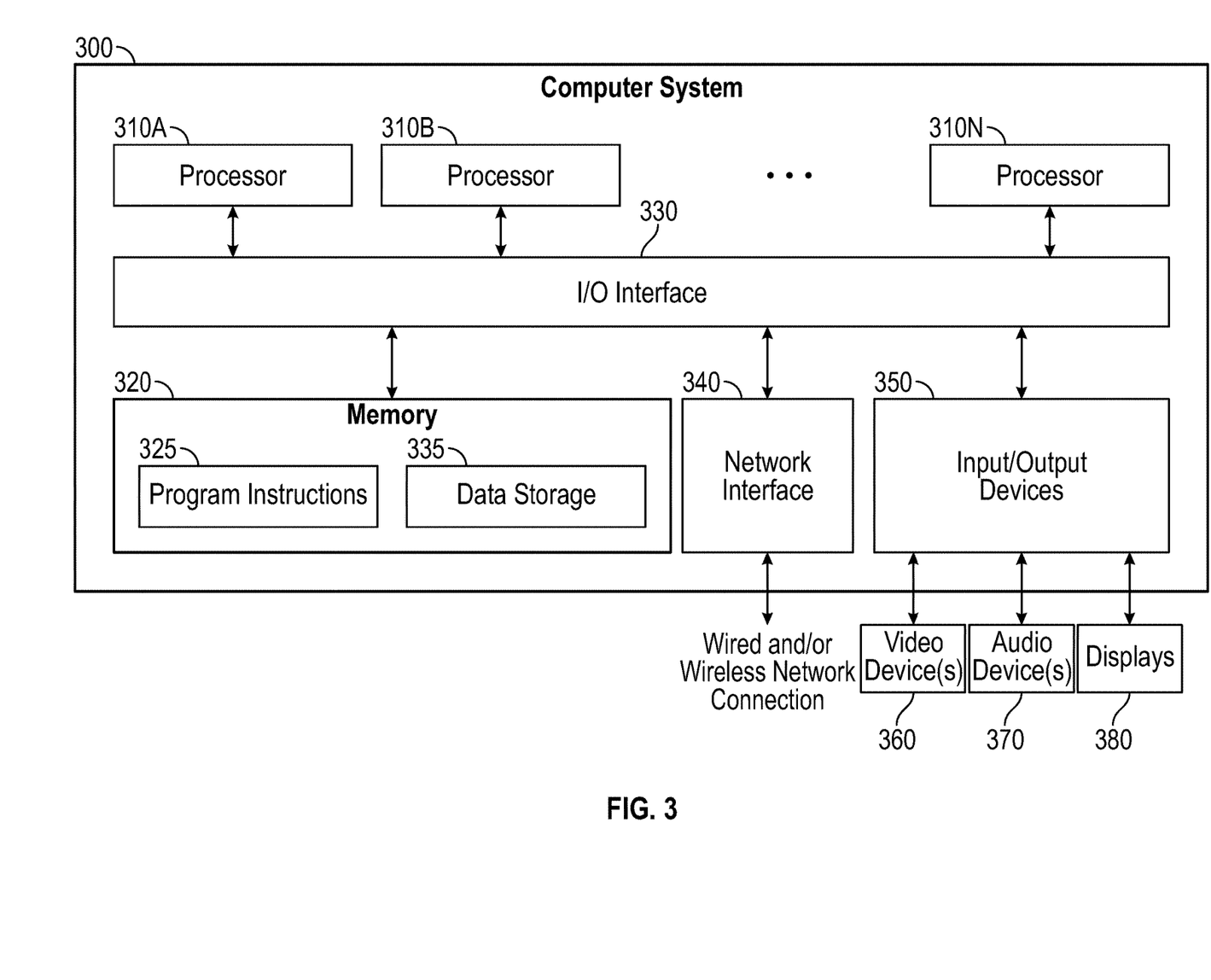
FIG. 3 is a block diagram of a computer system, device, station, or terminal configured to implement various techniques disclosed herein, according to some embodiments.

Embodiments of the present systems and methods for management of one-way video conferencing sessions, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example processes described herein. Computer system 300 may be used as, or as part of, one or more of controlled-environment facility communications processing system 202, resident devices 203-206, non-resident devices 207-208, 211-212, privilege communication system 220, and/or the like. In various embodiments two or more of these computer systems may be configured to communicate with each other in any suitable way, such as, for example, via a wired or wireless network.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. In the example described above, devices 206 and 201 have no video device 360 or such device is disabled during the video conference session. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations, such as, for example, those described in the figures above, may be stored within system memory 320 as program instructions 325 and data storage 335, respectively. In other embodiments, program instructions and/or data may be received, sent or stored upon different types of computer-accessible media or on similar media separate from system memory 320 or computer system 300. A computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing communications in a controlled-environment facility, comprising:
   receiving a privileged communication from a user via an online portal, the user having been previously confirmed as having a privileged relationship with a resident of the controlled-environment facility;
   receiving a nonprivileged communication via the online portal;
   processing the privileged communication through a communications system comprising a privileged communication channel and a privileged database;
   processing the nonprivileged communication through the communications system comprising a nonprivileged communication channel and a nonprivileged database, wherein the nonprivileged communication channel is separate from the privileged communication channel, and wherein the nonprivileged database is separate from the privileged database;
   storing the privileged communication in the privileged database in a manner that prevents inspection by controlled-environment facility staff;
   transmitting the privileged communication to the resident via the privileged communication channel to prevent inspection by controlled-environment facility staff; and
   notifying the user when the privileged communication has been accessed by the resident.

2. The method of claim 1, further comprising:
   notifying the resident that the privileged communication has been received.

3. The method of claim 1, wherein confirming that the user has a privileged relationship with a resident of the controlled-environment facility further comprises:
   verifying the user's identity with a public database; and
   verifying a professional registration for the user with a professional organization.

4. The method of claim 3, wherein the public database is selected from one or more of: a state agency database, a federal agency database, a drivers' license database, a public identity card database, a marriage record database, and a passport database.

5. The method of claim 3, wherein the professional organization is selected from one or more of: an attorney bar association, a medical association, a union, a religious organization and a Social Security Administration.

6. The method of claim 1, wherein transmitting the privileged communication to the resident in a manner that prevents inspection comprises:
   encrypting the privileged communication when it is received;
   transmitting the encrypted privileged communication to a resident device; and
   decrypting the privileged communication at the resident device.

7. The method of claim 1, wherein the nonprivileged communication is processed in at least one of the following ways: alerted, recorded, inspected, scanned, or monitored.

8. The method of claim 1, wherein the privileged communication is one or more of a document, an image, a text message, an email, or a voicemail.

9. The method of claim 1, further comprising:
   allowing the resident to edit the privileged communication; and
   transmitting the edited privileged communication to the user in a manner that prevents inspection by controlled-environment facility staff.

10. The method of claim 9, wherein editing the privileged communication comprises adding an electronic signature to the privileged communication server communication.

11. The method of claim 9, further comprising:
    storing the edited privileged communication in a manner that prevents inspection by controlled-environment facility staff.

12. A system, comprising:
    a controlled-environment resident device running a client application operable to access privileged communications;
    a communications system for processing privileged communications comprising a privileged database, a privileged communication channel and a privileged communication server, wherein the privileged database configured to store the privileged communication in a manner that prevents inspection by controlled-environment facility staff, and wherein the the privileged communication server comprising at least one processor, and a memory coupled to the at least one processor, the memory configured to store program instructions executable by the at least one processor to cause the privileged communication server to:
       receive a privileged communication from a sender via an online portal, the sender having been previously confirmed as having a privileged relationship with a resident of a controlled-environment facility;
       transmit the privileged communication to the controlled-environment resident device via a privileged communication channel that bypasses a nonprivileged communication channel to prevent inspection by controlled-environment facility staff;
       notify the resident that the privileged communication has been received; and
       notify the sender when the privileged communication has been accessed by the resident; and
    a separate nonprivileged communication channel for processing nonprivileged communications comprising a nonprivileged database and a communication processing server, wherein the communication processing server comprising at least one process, and a memory coupled to the at least one processor, the memory configured to store program instructions executable by the at least one processor to cause the communication processing server to:

transmit the nonprivileged communication to the controlled-environment resident device via the nonprivileged communication channel, wherein the nonprivileged communication bypasses the privileged communication channel.

13. The system of claim 12, wherein the privileged communication server is further configured to:

verify the sender's identity with a public database; and verify a professional registration for the sender with a professional organization.

14. The system of claim 12, wherein the privileged communication server is further configured to:

encrypt the privileged communication when it is received;

transmit the encrypted privileged communication to the controlled-environment resident device; and decrypt the encrypted privileged communication at the controlled-environment resident device.

15. The system of claim 12, wherein nonprivileged communications are processed in at least one of the following ways: alerted, recorded, inspected, scanned, or monitored.

16. The system of claim 12, wherein the privileged communication is one or more of a document, an image, a text message, an email, or a voicemail.

17. The system of claim 12, wherein the controlled-environment resident device is further configured to:

allow the resident to edit the privileged communication; and transmit the edited privileged communication to the privileged communication server in a manner that prevents inspection by controlled-environment facility staff.

18. The system of claim 17, wherein the privileged communication is edited by adding an electronic signature to the privileged communication.

19. The system of claim 17, wherein the privileged communication server is further configured to:

store the edited privileged communication in a manner that prevents inspection by controlled-environment facility staff.

* * * * *

UNITED STATES PATENT AND TRADEMARK OFFICE
CERTIFICATE OF CORRECTION

| | |
|---|---|
| PATENT NO. | : 11,128,583 B2 |
| APPLICATION NO. | : 16/047826 |
| DATED | : September 21, 2021 |
| INVENTOR(S) | : Pickens et al. |

It is certified that error appears in the above-identified patent and that said Letters Patent is hereby corrected as shown below:

In the Claims

In Column 14, at Line 28, delete "the privileged communication server communication." and insert -- the privileged communication. --

In Column 14, at Line 43, delete "the the privileged" and insert -- the privileged --

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*